No. 637,464. Patented Nov. 21, 1899.
J. HOSTETTER & J. Y. KLINE.
PLANT SETTER.
(Application filed Jan. 19, 1899.)
(No Model.)
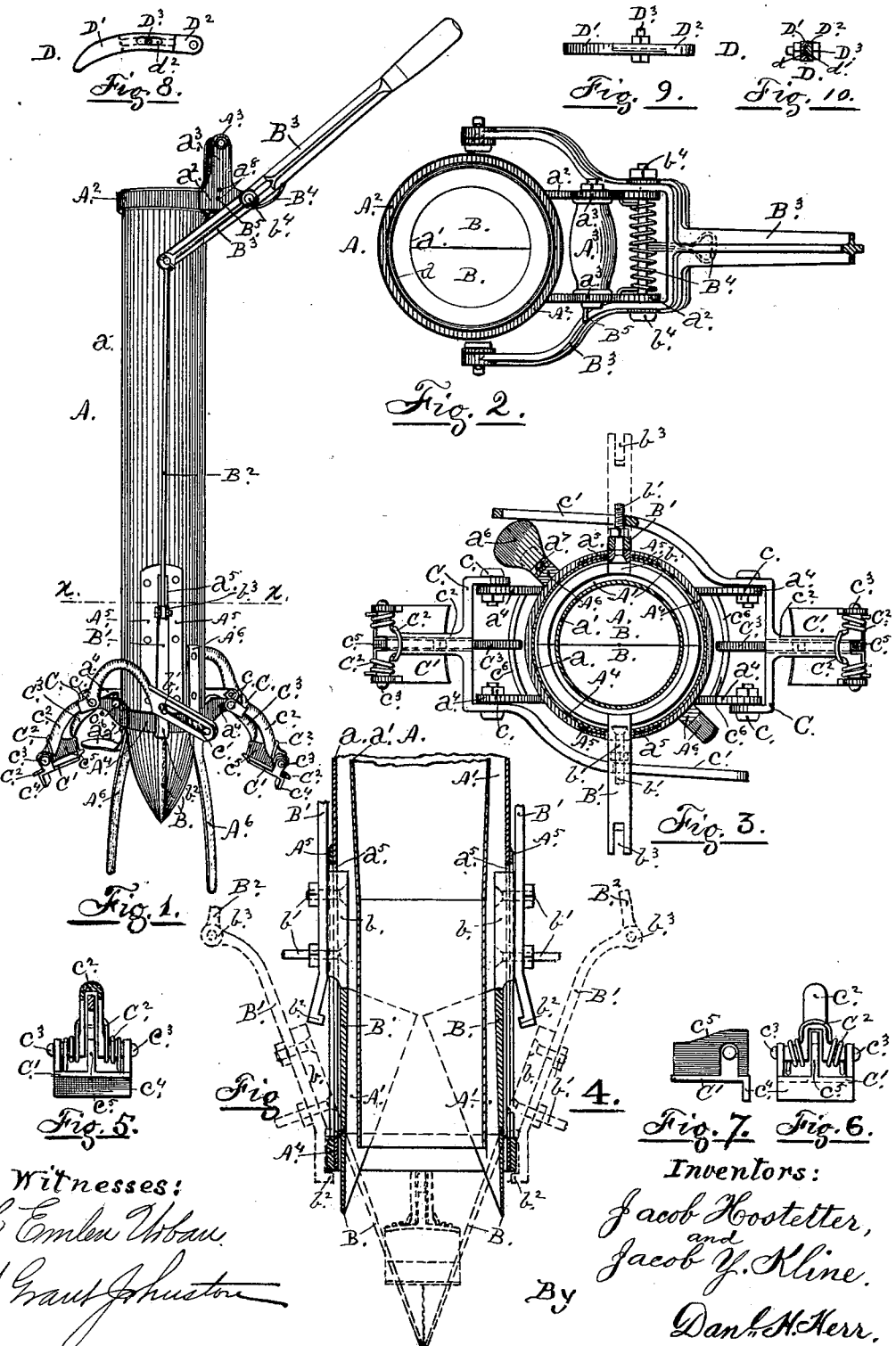
Witnesses:
C. Emlen Urban
N. Grant Johnston
Inventors:
Jacob Hostetter,
and
Jacob Y. Kline.
By
Danl. H. Kerr,
Attorney.

UNITED STATES PATENT OFFICE.

JACOB HOSTETTER AND JACOB Y. KLINE, OF FLORIN, PENNSYLVANIA.

PLANT-SETTER.

SPECIFICATION forming part of Letters Patent No. 637,464, dated November 21, 1899.

Application filed January 19, 1899. Serial No. 702,720. (No model.)

*To all whom it may concern:*

Be it known that we, JACOB HOSTETTER and JACOB Y. KLINE, citizens of the United States, residing at Florin, in the county of Lancaster and State of Pennsylvania, have invented certain new and useful Improvements in Plant Setters or Transplanters; and we do hereby declare the following to be a full, clear, and exact description of the invention, such as will enable others skilled in the art to which it pertains to make and use the same.

This invention relates to improvements in a plant setter or transplanter of that class in which two shovels or trowels, as well as presser-plates, with scrapers, are arranged at the lower end of a suitable body and so operated as to make a hole or opening in the ground or earth, place a plant therein, bring the earth or ground against and compress it about said plant, setting or planting the same by a simple downward pressure on the outer end of a hand-lever centrally pivoted or fulcrumed to the upper end of said body, and the forward or inner end of said lever performing the work being bifurcated or two-pronged.

The object of the invention is the construction of a device or machine whereby seedling-plants—such as tobacco, cabbage, celery, and the like—or nursery-sprouts may be set or transplanted with the precision of handwork without having to bend the back or to stoop, as is required in the latter case.

The elements of the invention will severally and at large appear in the following description, and they will be separately and combinedly set forth in the claims.

The purposes of the invention are attained by the mechanism and devices illustrated in the accompanying drawings, similar reference characters designating like parts throughout the several views, in which—

Figure 1 is an elevation in perspective of a plant-setter embodying the elements of the invention, being in the position of receiving and setting the desired plants. Fig. 2 is an enlarged top view of the same, showing the hand-grip and depressing-lever in position with the outer portion of the latter broken away for want of room in the drawing. Fig. 3 is an enlarged cross-section practically on the line $x\ x$ in Fig. 1 with the upper portion of the legs and one of the shovel arms or levers removed. Figs. 4, 5, 6, and 7 are enlarged views showing elements in detail and combination used in the construction and operation of the planter; and Figs. 8, 9, and 10 are views of a modification of the compressing-finger, showing the same to be adjustable as to length.

The body A of the planter in question is preferably cylindrical in form, comprising an outer tube $a$ of prescribed dimensions and an inner tube $a'$, somewhat funnel-shaped, fitting closely, but loosely, in order to be removable therefrom to the outer tube at the upper end and leaving a prescribed annular space $A'$ in the lower portion and opening out through the lower end thereof. Around the upper end of the body and rigidly affixed to the outer tube is a prescribed ring $A^2$, provided with side projecting arms $a^2\ a^2$, having upwardly-projecting ears $a^3\ a^3$ and between the upper ends of which is secured a hand-grip $A^3$, whereby the planter may be carried and held in operating position. Around the lower end of the body and also rigidly affixed to the outer tube is a prescribed ring $A^4$, provided with upwardly and outwardly sloping arms $a^4\ a^4\ a^4\ a^4$, disposed in diametrically opposite pairs. Midway between these arms and diametrically opposite the outer tube is provided with slots $a^5\ a^5$, extending from the upper edge of the ring $A^4$ a prescribed distance upward, and surrounding the slots, rigidly secured to the outer tube, are strengthening-strips $A^5\ A^5$, as shown, while adjacent to the strips and next to each pair of arms $a^4$ are prongs $A^6\ A^6$, also rigidly secured to said tube and adapted to enter the ground the required depth, one prong being provided with a gage-plate $a^6$, adjustable up and down thereon by means of an oblong slot and a set-screw $a^7$ through said slot and tapped into said prong to gage said depth.

At the lower end of the body and between the prongs are arranged two shovels B B, forming practically an inverted cone, said shovels having their upper ends within the annular space $A'$ between the tubes, and said ends are provided with longitudinally-extending arms $b\ b$, passing through the slots $a^5$ and having secured to their outer faces levers or bars $B'$ B' by bolts and nuts $b'$, the lower bolts having their outer ends projecting a prescribed distance beyond their nuts. At the lower ends of these bars and somewhat angular therewith are introverted hooks $b^2$, engaging the lower edge of the ring $A^4$, and at their upper ends are outwardly-curving jaws $b^3$, provided with eyes, to which are pivoted the lower ends of connecting-rods $B^2$, with their upper ends pivoted to the forward ends of a two-pronged lever-arm $B^3$, pivoted between the prongs to the outer ends of the arms $a^2$ by a bolt and nut $b^4$, with its rearward end or handle upwardly and outwardly inclining, while a spring $B^4$, coiled about said bolt and acting upon said handle, serves to hold it in said inclined position, and a pin $B^5$, having been inserted into one of the orifices $a^8$, placed in the handle-bar framework of the upper ring, serves to check or stop the downward motion of the handle of said lever.

To the outward ends of the pairs of arms $a^4$ are pivoted the branches of the bars of yokes C by bolts and nuts $c$, each yoke having one of its branches archingly and circumferentially extended to a point outside of a shovel-lever, where it is continued in a downwardly-sloping direction a prescribed distance, the sloping extension being provided with an oblong slot $c'$, engaging on the projection of the adjacent shovel-arm bolt $b'$. The outer faces of the yoke-bars are centrally provided with downwardly-curving and outwardly-disposed arms $c^2$, with U-shaped recesses underneath extending through the bars and their forward ends, where the arms are provided with side-projecting lugs, to which are pivoted, as by screws $c^3$, the upwardly-projecting ears of press-plates C', having at their outer edges downwardly-projecting lips $c^4$ and on their upper faces upwardly-projecting walls $c^5$, and their rearward edges are made outwardly concave, while the walls have sloping tops with their highest points between the pivot-ears where they enter the recesses between the pivot-lugs of the arms, and springs $C^2$, folded over the arms and coiled about the pivot-lugs with their extremities engaging on top of the plates at their forward edges, serve to keep said edges pressed downward. Engaging on top of these walls, at their lowest or inner ends, are the rounded outer extremities of curved fingers $C^3$ with their backs in the U-recesses of the yoke-bars and their curved arms and the inner ends pivoted onto rods $c^6$ with their extremities secured into the ring-arms $a^4$.

Figs. 8, 9, and 10 show a finger D, made adjustable as to length, which may be used in place of the finger $C^3$, before mentioned. This finger is vertically divided into two portions D' $D^2$, placed side by side and joined together by a bolt and nut $D^3$. (Best shown in Fig. 9.) To keep these portions vertically in place in their adjacent faces, one is provided with a groove $d$ and the other with a feather $d'$, fitting into said groove, (best shown in Fig. 10,) while in the body of each is an oblong recess $d^2$, through which the bolt $D^3$, with its nut, performs its functions. (Best shown in Fig. 8.)

Now the several parts hereinbefore described and occupying the respective positions indicated in the drawings, the following observations will be noted: that the body of the planter is formed of two tubes, one placed within the other, the outer one constituting the supporting framework and the inner one serving as a funnel to guide the plants within the recess or hollow between the shovels; that by means of the hand-grip $A^3$ at its upper end the planter may be conveniently carried, its lower end inserted in the ground and held firmly in operative position; that by reason of the prongs $A^6$ entering the ground the lower end of the planter will be held securely in place; that by reason of the gage-plate $a^6$ being adjustable up and down on its prong $A^6$ the depth to which the shovels will enter the ground may be readily gaged; that the shovels B being in the form of an inverted cone will readily enter the ground and make the required hole, carrying the plant dropped within them; that the hooks $b^2$ in engaging the lower edge of the ring $A^4$ will prevent the shovels from moving upwardly, compelling them to enter the ground; that by reason of the forward ends of the lever-arm $B^3$ being connected to the outer ends of the shovel-levers B' by means of the rods $B^2$ a downward pressure on said lever-arm will draw the upper ends of said shovel-levers inwardly, spreading the shovels and disengaging said hooks from said ring; that by reason of said spreading of the shovels said hole will be widened and the plant held by them dropped therein with its roots on the ground, and by reason of said disengagement a further downward pressure on said lever-arm will move the said shovels out of the ground within the annular space A' between the tubes; that this upward movement of the shovels and the engagement of the outer ends of the bolts $b'$ in the slots $c'$ of the yoke-arms depresses the outer ends of the arms $c^2$ downwardly and inwardly toward the plant, carrying the press-plates C' with them; that in this downward and inward motion of the press-plates the lips $c^4$ will draw earth toward and about the plants, the plates compressing it; that the fingers $C^3$, being practically stationary at their pivoted ends on the rods $c^6$, with their backs in the U-recesses of the arms $c^2$ and against the yoke-bars, the points of said fingers will move forward on the tops of said walls $c^5$ and up their slopes, depressing the inner ends of said plates and complete the compressing; that the degree of said compressing is determined by the degree of the downward pressure on the outer end of the lever-arm $B^3$ with the pin $B^5$ in any of the orifices $a^8$ gaging said downward pressure, and that when said downward pressure is removed the springs $B^4$ and $C^2$ will promptly return the parts to their normal positions. (Indicated in Fig. 1.)

Having now described the invention and ascertained and set forth the manner in which it performs its functions, what we do consider new, and desire to secure by Letters Patent, is—

1. A planter, comprising: an outer tube, with shovel-arm guide-slots through its sides to near the lower end; an inner tube within said outer tube, closely fitting at their upper ends, with an annular space between the tubes, from their lower ends a prescribed distance upward; an upper end-surrounding ring rigidly affixed to said outer tube, said ring having side-projecting lever-pivoting arms with upwardly-projecting handle-supporting ears, and a hand-grip secured between the upper ends of said ears; a lower end-surrounding ring, rigidly affixed to said outer tube, said ring having oppositely-disposed pairs of yoke-pivoting arms; oppositely-disposed ground-entering prongs, with their upper ends rigidly secured to the lower end of said outer tube; and, a gage-plate, by means of an oblong slot and set-screw therethrough, adjustably secured to one of said prongs; with mechanism provided for making a hole in the ground, placing a plant therein, drawing and compressing the ground about said plant, and returning the parts thereof to their normal positions, all substantially as described and for the purpose hereinbefore set forth.

2. The combination in a planter, with a body comprising an outer tube and an inner funnel-like tube, having closely-fitting upper ends and an annular space between them and opening through their lower ends, and a handle and lever-pivoting arms at the upper end, oppositely-disposed pairs of yoke-pivoting arms at the lower end, ground-entering prongs secured to said body, and shovel-arm guide-slots in opposite sides of said outer tube, of hollow shovel-blades placed conically together, having their open ends within the opening of said annular space, longitudinally-extending integral arms passing slopingly through said guide-slots and means for holding them in said position, with mechanism provided to release said holding, spread them outwardly apart, draw them up into said annular space, and return them to said normal position, all substantially as described and for the purpose hereinbefore set forth.

3. The combination in a planter with a bitubular body, having an encircling ring about the lower end thereof, longitudinal guide-slots in the sides of the outer tube and extending to said encircling ring, an annular space between the tubes and opening through the lower end of the body, hollow shovel-blades with their side edges brought together and their upper edges provided with longitudinally-extending integral arms and entering into the opening of said annular space with said arms extending slopingly through said guide-slots, of lever-bars with angular downward extensions rigidly secured to the outer faces of said shovel-arms, introverted hooks at the lower ends of said extensions to engage on the lower edge of said lower-end-encircling ring, and pivoting-jaws with eyes at the upper ends of the bars, with mechanism provided to disengage said hooks, move the shovel-blades outwardly, draw them up into said annular space, and return all again to their respective normal positions, substantially as described and for the purpose hereinbefore set forth.

4. The combination in a planter having a bitubular body with opposite pairs of pivot-arms at its lower end and an annular space between the tubes and opening through the lower ends thereof, and shovel-blades moving through said opening in said space and having longitudinally-extending arms sloping outwardly through slots in the sides of the outer tube of said body, with shovel lever-bars secured to the outer faces of said arms, said bars having eyed pivot-jaws at their upper ends, introverted engaging hooks at their lower ends, and pins projecting beyond their outer faces, of yoke-bars pivoted to the outer ends of said pairs of arms, said yoke-bars having each a curved arm passing by the slotted sides of said tubular body and said curved arms having downwardly-sloping extensions provided with guide-slots to be engaged by the pin projections of said shovel-arms, and said yoke-bars having also forwardly and downwardly curving arms with U-shaped recesses underneath and opening through their forward ends into slots, with pivot-lugs on the sides of said forward ends; presser-plates with upwardly-projecting ears near their forward ends and pivoted through said ears to the ends of said lugs, downwardly-projecting lips at the forward edges of said plates and upwardly-projecting walls on their tops at the median lines thereof, said walls having sloping upper edges with their highest points at their forward ends, and said ends passing through the slots between said lugs; springs with their folded ends on the tops of the forward ends of the yoke-arms, their coils about the pivot-lugs, and their free ends on top of the forward edges of the press-plates, to hold said edges down and their rearward edges up; and curved fingers having their backs in the U-recesses of the yoke-arms and against the yoke-bars, the points of their outer ends on the lower ends of the press-plate walls, and their inner ends pivoted on rods having their extremities secured into the yoke-arm pivot-bars; with mechanism provided to draw the upper ends of the shovel lever-bars inwardly, the shovels upwardly, and return the parts to their several normal positions; all substantially as described and for the purpose hereinbefore set forth.

5. The combination in a planter having a bitubular body with upper and lower end surrounding rings secured to said body, with an annular space between its tubes opening through the lower end thereof, and slots in the opposite sides of the outer tube and extending to said lower ring; a hand-grip with a pair of side-projecting lever-pivoting arms secured to said upper ring; a bifurcated hand operating lever having its bifurcated arms pivoted to the outer ends of said pivoting-arms, and a spring arranged to hold the handle of said lever in outwardly and upwardly inclined position, and the forward ends of its bifurcated arms on opposite sides of the tubular body; oppositely-disposed pairs of yoke-pivoting arms projecting from the sides of said lower ring; earth drawing and compressing arms, by means of central yoke-bars, pivoted to the outer ends of said pairs of pivoting-arms; earth drawing and compressing plates pivoted to the outer ends of the forward members of said drawing and compressing arms, with springs arranged to hold said drawing and compressing plates in inwardly and upwardly inclined positions; fingers having their forward ends engaging on top of said plates, and having their rearward ends pivoted in place inward from said yoke-bar pivoting-points; and the rearward members of said earth drawing and compressing arms, extending inward and downward, passing the slotted sides of said tubular body, with oblong pin-engaging slots in said extensions; shovels with longitudinally-extending arms at their upper ends, having said ends in the opening of said annular space and their arms passing through the side slots; and lever-bars rigidly secured to said shovel-arms, said lever-bars having lower-end ring-engaging hooks, upper-end pivoting-jaws, and outwardly-projecting pins engaging in the slots of said earth drawing and compressing arms; of connecting-rods, having their lower ends pivoted to the upper ends of the shovel lever-bars, and their upper ends to the lower ends of the bifurcated arms of the hand operating lever, all substantially as described and for the purpose hereinbefore set forth.

In testimony whereof we affix our signatures in presence of two witnesses.

JACOB HOSTETTER.
JACOB Y. KLINE.

Witnesses:
   JOHN A. MASTERSON,
   W. C. BATES.